Nov. 24, 1970

P. DANTOWITZ 3,541,729

COMPACT REACTOR-BOILER COMBINATION

Filed May 9, 1968

INVENTOR:
PHILIP DANTOWITZ,

BY  Carl O. Thomas

HIS ATTORNEY.

United States Patent Office 3,541,729
Patented Nov. 24, 1970

3,541,729
COMPACT REACTOR-BOILER COMBINATION
Philip Dantowitz, Peabody, Mass., assignor to General
Electric Company, a corporation of New York
Filed May 9, 1968, Ser. No. 727,885
Int. Cl. C01b *1/13;* B01j *7/00*
U.S. Cl. 48—94       3 Claims

ABSTRACT OF THE DISCLOSURE

A fuel for a fuel cell unit is prepared by feeding a mixture of reformable fuel and steam to a catalyst bed in indirect heat transfer relation with a hot fluid stream. The hot fluid is then passed into indirect heat transfer relation with a water reservoir of a surrounding boiler portion. The reaction products including hydrogen received from the catalyst bed are fed into indirect heat transfer relationship with the water reservoir. Steam from the boiler is mixed with the incoming fuel.

BACKGROUND OF THE INVENTION

In indirect feed fuel cell systems a hydrocarbon or a partially oxidized derivative, such as an alkanol, aldehyde, ketone, carboxylic acid, etc., may be chemically reacted to liberate free hydrogen before the feed is brought into contact with the anode of a fuel cell. In one conventional approach the fuel is mixed with steam and reformed upstream of the fuel cell anode to liberate free hydrogen. The free hydrogen, usually in a reformate mixture including other reaction products and residual reactants, is fed to a fuel cell anode.

In reacting a reformable fuel and water to produce a hydrogen containing reformate utilizable at a fuel cell anode it is necessary to perform a number of operations. The water must be heated and converted to steam to assure thorough mixing with the reformable fuel. The mixed fuel and steam are brought into contact with a catalyst and react endothermally to produce the hydrogen containing reformate. This means that heat must be continuously supplied in order to drive the reaction. Generally the reaction products leave the catalyst bed at a much higher temperature than can be tolerated by the particular type of fuel cell unit being operated. Accordingly, it is usually desirable that at least some heat be dissipated from the fuel stream prior to reaching the fuel cell unit. Additionally, it is usually also desirable to perform a supplemental reaction to reduce the proportion of carbon monoxide associated with the free hydrogen and thereby minimize anode catalyst poisoning. To avoid poisoning the reforming catalyst, it may also be desirable to preliminarily desulfurize the reformable fuel prior to reforming.

Various systems and methods for reforming a feed stock prior to delivery of a fuel cell anode are disclosed by Bartas in patent application Ser. No. 530,188, filed Feb. 25, 1966, titled System and Process for the Indirect Electrochemical Combination of Air and a Reformable Fuel and Chludzinski et al. in patent application Ser. No. 546,326, filed Apr. 29, 1966, and now abandoned titled System and Process Employing a Reformable Fuel to Generate Electrical Energy. These disclosures, here incorporated by reference, are typical of prior systems for processing and delivering a fuel cell feed stock in that a number of separate heat exchange structures are utilized in preparing the fuel for anode consumption. While this approach is advantageous in that simple, conventional exchangers can for the most part be utilized, the use of a number of separate elements in a system results in a system having a relatively large volume displacement. Where a high degree of compactness and portability are required these systems may not be fully acceptable.

BRIEF SUMMARY OF THE INVENTION

It is an object of my invention to provide a compact and efficient unit for contacting fluid reactants with a catalyst bed to produce reaction products.

It is another object of my invention to provide an apparatus capable of efficiently converting a mixture of a reformable fuel and steam to a hydrogen containing reformate feed stock suitable for consumption by a fuel cell unit.

These and other objects of my invention are accomplished in one aspect by providing an apparatus comprised of a means providing a source of hot fluid. A reaction sub-assembly is mounted to receive the hot fluid interiorly thereof and includes a catalyst bed. Means are provided for confining the catalyst bed in indirect heat transfer relation with the hot fluid. Means are provided for directing fluid reactants into contact with the catalyst bed, and means are provided for receiving fluid reaction products from the catalyst bed. A boiler sub-assembly is mounted exteriorly of the reaction sub-assembly and includes an annular housing means defining a water reservoir. Means are provided for receiving the hot fluid from the reaction sub-assembly and for directing the hot fluid into indirect heat transfer relation with the water within the reservoir.

BRIEF DESCRIPTION OF THE DRAWINGS

My invention may be better understood by reference to the following detailed description of the invention considered in conjunction with the drawings, in which.

DETAILED DESCRIPTION OF THE PREFERRED EMBODIMENT

Figure 1:
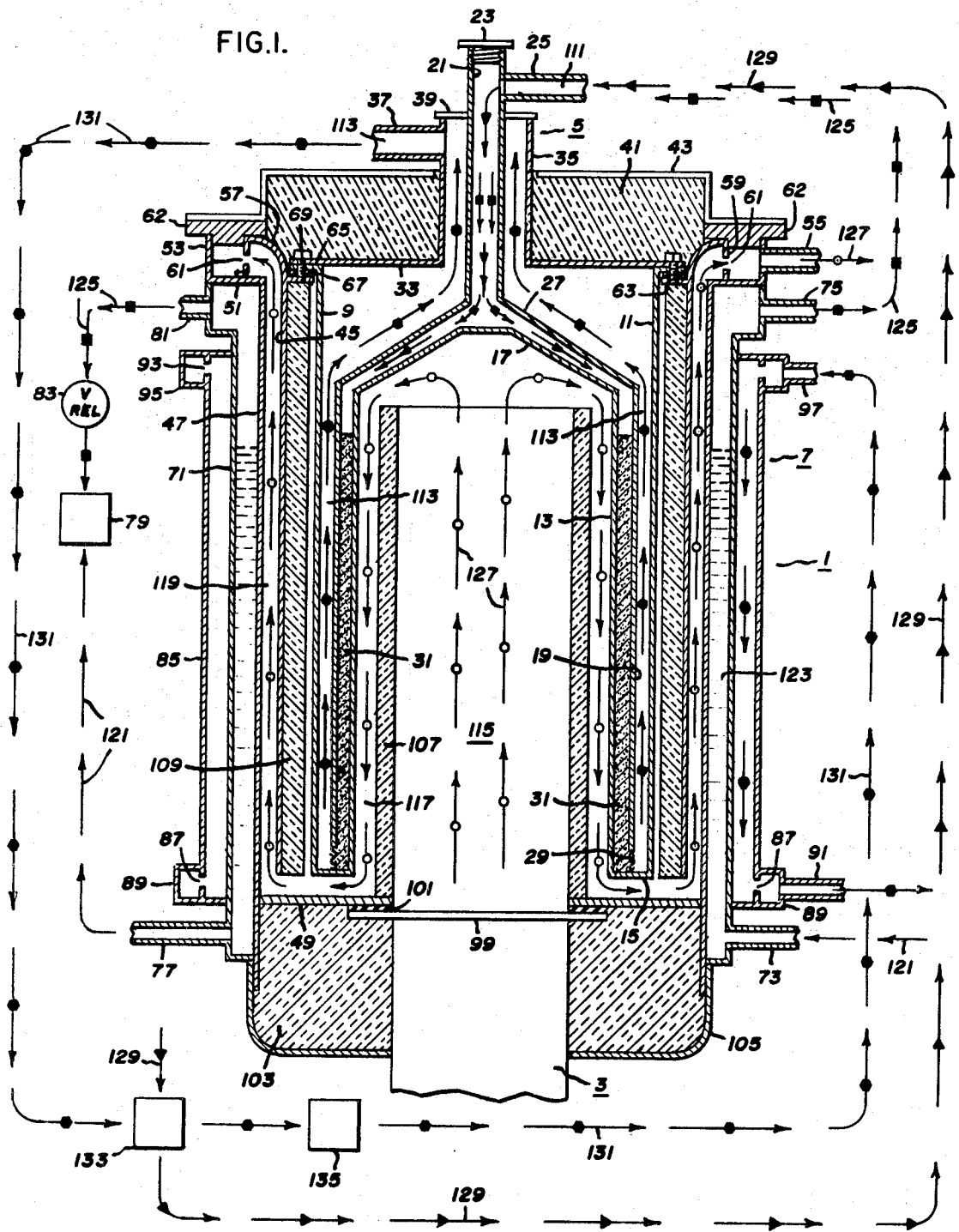
FIG. 1 is a vertical section with parts broken away and schematically illustrated.

In FIG. 1 my inventive reformer unit 1 is shown formed of a hot fluid source 3 which may be merely a conduit for the delivery of a hot fluid, but in most instances is a burner which produces hot fluid by combusting a fuel and air inside the unit. The unit is also comprised of a reaction sub-assembly 5 and a boiler sub-assembly 7. It is a significant feature of my invention that the reformer unit can be easily disassembled into sub-assemblies, and either the hot fluid source or reaction sub-assembly can be quickly withdrawn from the unit for servicing without disassembling the remaining portions of the reformer unit.

The reaction sub-assembly is comprised of a shell 9 having a cylindrical outer wall 11 connected at its lower end to a cylindrical inner wall 13 by an annular bottom wall 15. The upper end of the cylindrical inner wall is integrally joined to a frusto-conical baffle wall 17. Mounted concentrically between the inner and outer cylindrical walls of the shell is a cylindrical partition 19. Located above the partition is a reactant inlet conduit 21. The upper end of the inlet conduit is fitted with a threaded plug 23. A side arm 25 is provided to introduce the reactants into the inlet conduit. The reactant inlet conduit is integrally joined to the partition by a swedged transition section 27. The lower end of the partition is spaced from the bottom wall of the shell to provide for fluid passage therebetween. A screen 29 is connected between the lower end of the partition and the bottom wall to hold a catalyst bed 31 in position between the partition and inner cylindrical wall of the shell. An annular closure plate 33 sealingly cooperates with the shell and is centrally connected to an outlet conduit 35 having a side arm connection 37. An annular closure plate 39 is provided to close the upper end of the outlet conduit. Overlying the annular closure 33 is a body of thermal insulation 41. Two semi-circular guard plates 43 overlie the thermal insulation.

The boiler sub-assembly is provided with a cylindrical inner wall 45 concentrically spaced from an inner reservoir wall 47. An annular flange 49 extends inwardly from the inner reservoir wall and is spaced below the lower end of the inner wall. As shown in the drawing the inner reservoir wall is formed integrally at its upper end with an outwardly extending annular wall 51 which in turn is formed integrally with an upwardly extending annular wall 53. A hot fluid outlet conduit 55 is attached to the upwardly extending annular wall. The inner cylindrical wall is shown formed integrally with an outwardly flared wall 57 which is in turn formed integrally with a support wall 59. The support wall transmits the weight of the inner cylindrical wall to the outwardly extending annular wall. The support wall is apertured at 61 for the passage of hot fluid therethrough. An annular ring 62 fits between the support wall and the upwardly extending wall to assure spacing therebetween and form an annular plenum between the apertures and the hot fluid outlet.

The inner cylindrical wall is noted to be provided with a mounting flange 63 adjacent its upper end. The mounting flange supports the reaction sub-assembly, since the shell is provided with a flange 65 that overlies the mounting flange. A sealing gasket 67 is provided between the mating flanges, and bolts 69 are provided for a releasable connection between the boiler and reaction sub-assemblies.

An outer reservoir wall 71 is concentrically spaced from the inner reservoir wall, except at its upper and lower extremities, which are sealed to the inner reservoir wall. Thus, an annular reservoir is formed between these two walls. A water inlet conduit 73 is provided adjacent the lower end of the outer reservoir wall while a first steam outlet conduit 75 is provided adjacent the upper end of this wall. For purposes of monitoring the boiler, a water outlet conduit 77 is also provided adjacent the lower end of the outer reservoir wall and connects to a liquid level controller 79, which is schematically illustrated. A second steam outlet conduit 81 also connects to the liquid level controller through a pressure relief valve 83.

A reformate confining wall 85 is spaced concentrically from the outer reservoir wall, but is sealingly attached thereto at its upper and lower extremities. Adjacent its lower end the reformate confining wall is provided with reformate outlet apertures 87. An annular plenum wall 89 cooperates with the confining wall above and below the apertures and carries a reformate outlet conduit 91. Adjacent the upper end of the confining wall reformate inlet apertures 93 are provided which are similarly covered by an upper plenum wall 95 provided with a reformate inlet conduit 97.

A hot fluid source is shown provided with a flange 99 at its upper extremity which seals with annular flange 49 through an interposed gasket 101. The flanges 49 and 99 are preferably held in assembled relation by bolts, not shown. Beneath the annular flange and exteriorly of the hot fluid source thermal insulation 103 is provided. An annular guard 105 fits over the fluid source to protect and confine the thermal insulation. The annular guard cooperates with the lower extremity of the inner reservoir wall for mounting.

An annular thermally insulative baffle 107 is positioned centrally of the reaction sub-assembly. The baffle is supported by the annular flange 49. An annular thermally insulative shield 109 is also located between the boiler sub-assembly and the reaction sub-assembly.

From the foregoing description of the structure of the reformer unit 1 it is apparent that the side arm 25, reactant inlet conduit 21, and the spacing between the shell 11 and swedged transition portion 27 and partition 19 together form a reactant inlet passage 111 extending from the exterior of the reformer unit to the upper surface of the catalyst bed. The catalyst bed is fluid penetrable. Typically the catalyst is present in particulate form. For the purpose of reforming a hydrocarbon fuel or a partially oxidized derivative thereof by interaction with steam the catalyst may, for example, be comprised of particles of nickel supported on alumina, silica, or alumina-silica. Reforming catalysts are per se will known and per se form no part of my invention. It is noted that a wide range of suitable catalysts are reported by Dirksen et al. in Research Bulletin No. 20, titled Improvement of Nickel Cracking Catalysts, published October 1952, by the Institute of Gas Technology, and in Research Bulletin No. 4, titled Effect of Hydrogen Sulfide on Catalyst Activity in the Steam Propane Reaction, published at the same time by the same source. The space between the partition and the outer wall 11 of the shell together with the space between the reactant inlet conduit and the reaction product outlet conduit as well as the side arm 37 form a passage 113 whereby reaction products and residual reactants may be removed from the reformer unit.

The insulative baffle 107 defines an introductory hot fluid passage segment 115. The annulus between the insulative baffle and the inner cylindrical wall 13 of the shell forms a catalyst heating segment 117 of the hot fluid passage. The annulus between the cylindrical inner wall 45 and inner reservoir wall 47 provides an annular boiler heating segment 119 of the hot fluid passage. The hot fluid passage is terminally defined by the hot fluid plenum and the hot fluid outlet conduit 55.

The reformer unit may be constructed by conventional manufacturing techniques. In a preferred form the unit is formed of corrosion resistant metal, such as stainless steel, which is suitably bent and welded to construct the sub-assemblies described above. The reaction sub-assembly is prepared for operation by removing the threaded plug and introducing a particulate reforming catalyst to form the catalyst bed 31. The plug is then sealingly reunited to the inlet conduit 21. The reaction sub-assembly is placed in position on the gasket 67 and mounting flange 63 of the boiler assembly, and the bolts 69 are used to hold the two sub-assemblies firmly united. The thermal insulation 41 is then positioned over the reaction sub-assembly and the semi-circular guard plates 43 fitted over the thermal insulation.

The hot fluid source 3 is positioned with the flange 99 pressed against the flange 49 with gasket 101 interposed. The hot fluid source is illustrated only schematically. This portion of the apparatus may be a burner or merely a fluid conduit. Typically the source is fixedly and releasably attached to the boiler sub-assembly by bolting to the flange 49. After the source is located in position, thermal insulation 103 is fitted around the source and the annular guard 105 is mounted in position. Typically the guard is mechanically and releasably joined to the inner reservoir wall 47.

To place the reformer unit in operation, water, indicated by flow arrows 121, is introduced into the boiler reservoir 123. The level of the water within the boiler reservoir is continuously controlled by the liquid level controller 79. It is noted that the first steam outlet conduit 75 communicates with the reactant inlet passage 111 so that immediately upon heating the water within the boiler reservoir steam is produced and fed to the reaction sub-assembly. The flow path of the steam is schematically illustrated by flow arrows 125.

To generate steam and to bring the catalyst bed to the active reforming temperature hot fluid, indicated schematically by flow arrows 127, is released from the source 3 and passes through the introductory passage segment 115 to the catalyst heating segment 117. In the introductory passage segment of the hot fluid passage loss of heat from the hot fluid is held to a minimum by the thermally insulative baffle 107. Within the catalyst heating passage segment the hot fluid is in indirect heat transfer relation with the catalyst bed. Only the inner cylindrical wall of the shell separates the hot fluid and the catalyst. The insulative baffle serves the important function of directing the hot fluid so that it uniformly contacts the inner cylindrical wall of the shell. This is important, since the chemical reaction taking place within the catalyst bed is endothermic and removes considerable heat from the hot fluid. If the hot fluid transferred heat to one portion of the catalyst bed preferentially, this area could be overheated so as to overheat the catalyst while other portions of the catalyst bed might remain below optimum temperature for efficient performance. The hot fluid passes from indirect heat transfer relation with the catalyst bed to indirect heat transfer relation with the water within the boiler reservoir. Only the inner reservoir wall 47 separates the hot fluid within the passage segment 119 from the water within the reservoir. The hot fluid passes from the reformer unit through the outlet conduit 55.

Either simultaneously with the introduction of hot fluid into the reformer unit or at a later time, a reformable fuel, indicated by flow arrows 129, is introduced into the reactant inlet passage mixed with the steam produced by the boiler subassembly. When the catalyst bed has been heated to operating temperature, the reformable fuel and steam interact upon contact with the catalyst bed to liberate free hydrogen. Other reaction products formed include carbon dioxide, carbon monoxide, methane, and higher alkanes of lower molecular weight than the reformable fuel. To prevent the formation of carbon within the catalyst bed it is usual practice to operate with an excess of steam so that a substantial portion of steam flows through the catalyst bed unconsumed. Some portion of the reformable fuel also may not be consumed. The aggregate mixture of reaction products and residual unconsumed reactants is termed a reformate. The reformate is schematically indicated by flow arrows 131.

Since the reformate contains a large quantity of heat as it leaves the reaction sub-assembly through the side arm, it is preferred, but not essential, to utilize the reformate as an indirect heat transfer medium. In FIG. 1 this is schematically illustrated by directing the reformate from the reaction sub-assembly to the reformate inlet conduit 97 of the boiler sub-assembly. En route the reformate may be passed through a conventional indirect heat exchanger 133, schematically shown, to transfer heat from the reformate to the reformable fuel. In one form it is anticipated that the reformate may deliver heat to the reformable fuel by indirect heat transfer while the reformable fuel is in contact with a desulfurization catalyst. In this circumstance the reformable fuel can be not only heated but also relieved of any sulfur content that might tend to poison the reforming catalyst bed. Instead of utilizing heat from the reformate, a fraction of the hot fluid may be diverted from the hot fluid passage segment 115 for use in the heat exchanger 133. A preferred arrangement for desulfurization of a reformate is disclosed by Kegan in copending application Ser. No. 727,872, now abandoned, filed on even date herewith, the disclosure of which is here incorporated by reference. Where the reformate is to be ultimately supplied to a fuel cell unit it may also be desirable to convert a portion of the carbon monoxide present in the reformate to carbon dioxide. For this purpose a conventional shift reactor is schematically illustrated positioned downstream of the desulfurizer but upstream of the boiler sub-assembly.

The reformate in being circulated between the outer reservoir wall 71 and the reformate confining wall 85 transfers heat to the water within the boiler reservoir. The reformate upon finally leaving the reformer unit may be reduced in temperature to a level which can be tolerated by a fuel cell unit without appreciable further cooling.

As will readily be apparent the absolute temperature levels of the various portions of my reformer unit may be varied appreciably. The relative temperatures of fluid in indirect heat transfer relation may be controlled not only by regulating their temperatures, but also by controlling their velocities and volumes. Additionally the thermal characteristics of the separating layer as well as the incorporation or exclusion of heat transfer fins or their equivalent can greatly affect the heat transfer characteristics.

Where a hydrocarbon fuel is being reformed it is preferred that the hot fluid be supplied by burning a portion of the fuel in air within the reformer unit. This provides a source of hot fluid at temperatures in the range of from 1500 to 2000° F. Since reforming temperatures may range from 750 to 1600° F., adequate temperature differential may be obtained to thermally drive the reforming reaction. The velocity of the hot fluid may be sufficiently high to prevent the catalyst bed from heating to flame temperature and being damaged. For example, with nickel catalysts it is usually desirable to maintain the catalyst bed below 1200° F. during reforming to avoid sintering the catalyst into a composite structure that cannot be conveniently removed from the reaction sub-assembly. By the time the hot fluid is brought into indirect heat transfer relation with the water within the boiler reservoir a considerable amount of heat has been given up to drive the reforming reaction. Accordingly, the hot fluid is at a considerably reduced temperature, but still well above the 212° F. required to produce steam at atmospheric pressure. By flowing the reformate through the reformer unit countercurrent to the flow of water to the boiler reservoir, it is apparent that the reformate may actually be cooled to a temperature below the boiling point of water on exhaust. This relationship is of significance, since many aqueous electrolyte fuel cell units operate in temperature range between ambient temperature and the boiling point of water. It is recognized, of course, that many fuel cells, including some aqueous electrolyte fuel cells, operate efficiently at higher temperatures. Accordingly, cooling the reformate below the boiling temperature of water is by no means essential. It is desirable that the reformate be flowed in a downward direction to allow water condensed by cooling the reformate to be easily removed.

Desulfurization is conveniently effected in the temperature range of from 500 to 600° F. while the conversion of carbon monoxide to carbon dioxide in a reformate stream, conventionally referred to as a shift reaction, can be performed in the temperature range of from 500 to 550° F. These temperatures are noted to be intermediate the temperature of the reformate as it leaves the catalyst bed and the temperature required for steam generation in the boiler sub-assembly. It is anticipated that the reformable fuel may be initially chosen to have such a low sulfur content that desulfurization is unnecessary; hence no desulfurizer may be provided. In this circumstance the reformable fuel may be introduced into the passage 111 in liquid form and vaporized as it travels toward the catalyst bed. Also, where carbon monoxide can be tolerated in the reformate, as in a fuel cell unit which utilizes a palladium foil anode or hydrogen separation barrier, the shift reactor may be eliminated. It is also anticipated that the shift catalyst may, if desired, be located within the reaction sub-assembly within the reaction product passage 113. It is recognized that some adjustment of the location of thermally conductive and thermally insulating members may be required to maintain the shift catalyst at the proper temperature of operation. For example, the partition 19 may be formed of a thermally insulative material.

Figure 2:
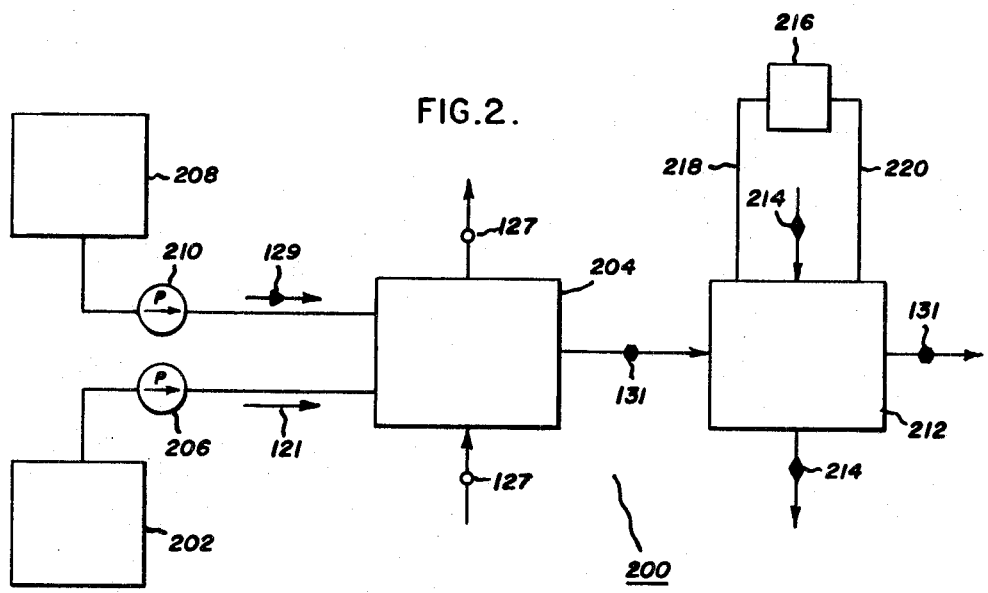
FIG. 2 is a schematic diagram of a simple system for the utilization of my apparatus.

My apparatus is particularly well suited for processing the fuel feed stock supplied to a fuel cell unit. A very simple system for the utilization of my apparatus shown in FIG. 1 is schematically diagrammed in FIG. 2. The system 200 is provided with a water source 202 which delivers water to the boiler sub-assembly of the reformer assembly 204 as indicated schematically by pump 206. Flow arrow 121 indicates the flow of water. At the same time a reformable fuel source 208 supplies reformable fuel, indicated by flow arrow 129, to the reformer assembly through pump 210. Hot fluid, indicated by flow arrows 127, passes through the reformer assembly to provide indirect heat exchange and thereby generate reformate, indicated by flow arrow 131. The reformate is fed directly to a fuel cell unit 212. The fuel cell unit, which may be any conventional fuel cell or battery capable of electrochemically oxidizing hydrogen, is also supplied with a conventional oxidant, indicated by flow arrows 214. An electrical load 216 is shown connected to the fuel cell unit by means of electrical leads 218 and 220.

The system 200 is intended merely to illustrate the utility of my invention and is not intended to imply that the application of my invention is limited thereto, since it is recognized that a number of diverse applications for my invention will be readily apparent to those skilled in the art. For example, while I have disclosed by my invention with reference to the steam reformation of a hydrocarbon or hydrocarbon derivative fuel, it is appreciated that the structural combination designated as a reformer unit may be applied to use with a wide range of chemical reactions. For example, instead of placing a reforming catalyst within the reformer unit as described, a shift catalyst may be placed with the unit instead. It is anticipated that iron oxide, mixtures of zinc and copper oxides, or any other conventional catalyst for shifting the equilibrium in a reformate from carbon monoxide to carbon dioxide may be substituted for the reforming catalyst. The temperature of the incoming hot fluid used for heating may be adjusted to provide the optimum reaction temperature. In such application reformate rather than a reformable fuel and steam mixture would be fed to the reaction sub-assembly. In another variation, a desulfurization catalyst may be utilized in place of a reforming catalyst. In this case the reformable fuel alone without steam mixed is fed to the reaction sub-assembly. The temperature of the hot fluid would again be adjusted to the optimum temperature level of desulfurization. It is recognized that the same catalysts are on occasion used for reforming and shifting as are used for desulfurization, so that it is not essential to even change catalysts in order to achieve this varied application. It is recognized that in its broadest aspects my invention apparatus may be utilized to accomplish any reaction of a fluid in a catalyst bed, since the fluid centrally supplied may be either a hot fluid or a cold fluid and hence suitable either for supplying or removing heat to maintain the desired reaction.

It is recognized that the construction of the reformer unit shown in FIG. 1 may be varied considerably without departing from my invention. For example, instead of forming the unit by welding together metal sheet stock, the elements of the unit may be formed by any conventional technique and united to form the disclosed structural arrangement. For example, the various elements may be bolted together using gasketing for sealing where desired. Also, elements of the unit may be integrally cast. It is not necessary that the unit be formed annularly as illustrated. The unit may be provided with a polygonal geometry. It is also anticipated that one or more of the various annuli may be broken up into a plurality of angularly distributed passages. Spacers may be placed within the unit where required to hold the elements concentrally arranged. The reformate confining wall may be omitted where it is not desired to use the reformate to aid in heating the water reservoir. It is not essential that the reformate outlet conduit of the reaction sub-assembly be concentric with the reactant inlet conduit. Also, the reformate may be transmitted from the reaction sub-assembly by providing a suitable passage through the unit rather than routing the reformate through external conduits. It is anticipated that the partition may be omitted from at least the lower portion of the shell and the catalyst bed will lie on both sides of the partition or in contact with both the inner and outer walls of the shell. In this circumstance an annular baffle may be provided to bring the hot fluid into intimate contact with both the inner and outer surfaces of the shell. The use of thermal insulation is optional. While thermal insulation is shown adjacent the upper and lower ends of the unit, it may be omitted entirely or additional insulation may be employed to cover the entire external surface as well as the external fluid conduits (preferred under most ambient conditions), depending upon ambient conditions and the degree of thermal efficiency desired. It is immaterial whether the insulative baffle is formed as part of the source, reaction sub-assembly, or boiler sub-assembly. The reaction sub-assembly may be supported on the mounting flange as illustrated, or this flange may be omitted and the reaction sub-assembly redesigned to seal against the upper surface of the ring.

Numerous variations will readily occur to those skilled in the art having knowledge of my invention. It is accordingly requested that the scope of my invention be determined with reference to the following claims.

What I claim and desire to secure by Letters Patent of the United States is:

1. An apparatus for reacting a reformable fuel and steam to produce free hydrogen comprising:
   means for providing a stream of hot fluid,
   a cylindrical reaction sub-assembly mounted to receive the hot fluid interiorly thereof,
   an annular chamber containing a reforming catalyst spaced from said cylindrical sub-assembly to define a passage for said hot fluid between said annular chamber and said cylindrical sub-assembly,
   means for passing said hot fluid in indirect heat transfer relation with said catalyst.
   means for directing a mixture of reformable fuel and steam into contact with the reforming catalyst, and
   means for receiving reaction products including free hydrogen from said reforming catalyst, and
   a boiler sub-assembly mounted exteriorly of said reaction sub-assembly and said annular chamber including:
      annular housing means defining a water reservoir spaced from said annular chamber to define a further passage for said hot fluid between said annular chamber and said water reservoir.
      means for passing the hot fluid from the passage between said cylindrical sub-assembly and said annular chamber and directing the hot fluid into said further passage and thereby into indirect heat transfer relation with the water within the reservoir to convert a portion of the water to steam, and
      means for directing at least a portion of the steam to said reaction sub-assembly.

2. An apparatus according to claim 1 including means for directing at least a portion of the reaction products to said boiler sub-assembly and said boiler sub-assembly additionally including means for directing the fluid reactants into indirect heat transfer relation with the water within the reservoir.

3. An apparatus according to claim 2 in which said means for directing reaction products to said boiler subassembly includes means to react carbon monoxide and water to produce hydrogen and carbon dioxide.

References Cited

UNITED STATES PATENTS

| | | | |
|---|---|---|---|
| 2,886,507 | 5/1959 | Elliott et al. | 48—196 X |
| 3,278,268 | 10/1966 | Pfefferle | 48—214 X |
| 3,350,176 | 10/1967 | Green et al. | 48—214 X |
| 3,438,759 | 4/1969 | Linden et al. | 48—214 X |
| 3,469,944 | 9/1969 | Bocard et al. | 48—214 X |

MORRIS O. WOLK, Primary Examiner

R. E. SERWIN, Assistant Examiner

U.S. Cl. X.R.

23—212, 288; 48—214; 252—373